(12) United States Patent
Baumeister et al.

(10) Patent No.: US 7,149,972 B2
(45) Date of Patent: Dec. 12, 2006

(54) DISPLAY OF FOLLOW-UP INFORMATION RELATING TO INFORMATION ITEMS OCCURRING IN A MULTIMEDIA DEVICE

(75) Inventors: Markus Baumeister, Aachen (DE); Heribert Baldus, Aachen (DE); Andras Montvay, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 558 days.

(21) Appl. No.: 10/140,496

(22) Filed: May 7, 2002

(65) Prior Publication Data
US 2002/0191012 A1 Dec. 19, 2002

(30) Foreign Application Priority Data
May 10, 2001 (DE) .................. 101 22 597

(51) Int. Cl.
G06F 3/00 (2006.01)
G06F 17/30 (2006.01)
G06F 17/40 (2006.01)

(52) U.S. Cl. ............... 715/716; 715/721; 715/512; 715/720; 715/968; 707/104.1; 707/6; 707/3

(58) Field of Classification Search ........... 715/723, 715/724, 721, 725, 716, 720, 719, 968, 512, 715/500.1, 501.1; 707/104.1, 3, 6
See application file for complete search history.

(56) References Cited

U.S. PATENT DOCUMENTS

| | | | |
|---|---|---|---|
| 5,655,117 A * | 8/1997 | Goldberg et al. | 707/102 |
| 5,973,685 A * | 10/1999 | Schaffa et al. | 715/722 |
| 6,195,458 B1 * | 2/2001 | Warnick et al. | 382/173 |
| 6,675,159 B1 * | 1/2004 | Lin et al. | 707/3 |
| 6,675,174 B1 * | 1/2004 | Bolle et al. | 707/104.1 |
| 6,744,922 B1 * | 6/2004 | Walker | 382/190 |
| 6,842,761 B1 * | 1/2005 | Diamond et al. | 707/104.1 |
| 6,877,010 B1 * | 4/2005 | Smith-Semedo et al. | 707/104.1 X |
| 2001/0005430 A1 * | 6/2001 | Warnick et al. | 382/173 |
| 2005/0267879 A1 * | 12/2005 | Sekiguchi et al. | 707/3 |

* cited by examiner

*Primary Examiner*—Raymond J. Bayerl

(57) ABSTRACT

The invention relates to a multimedia device, which detects at least one information item in an audio and/or video data stream processed by the multimedia device, saves the detected information items as a function of a weighting consisting of the time of occurrence of an information item and at least one selection criterion and displays follow-up information relating to the information item selected by a user on an output unit of the multimedia device.

20 Claims, 1 Drawing Sheet

DISPLAY OF FOLLOW-UP INFORMATION RELATING TO INFORMATION ITEMS OCCURRING IN A MULTIMEDIA DEVICE

The invention relates to a method which allows a user of a multimedia device to obtain further information relating to information items unfamiliar to him/her occurring in an audio and/or video data stream.

Patent specification U.S. Pat. No. 5,973,685 describes a method for transmitting supplementary information or pointers, which are presented to a user of a digital transmission medium. The additional information and pointers are transmitted together with the user data within the data stream. The method introduces means for embedding supplementary information in audio/video data streams in the form of frames, thus the information is transmitted on a frame-related basis. The user may make a selection from information extracted from the data stream by demultiplexing, such that an additional channel need not be transmitted for the information. The supplementary information may consist of pointers, which point to information transmitted on separate channels.

It is an object of the invention to provide the user with a broad information basis in relation to the messages received by the multimedia device.

The object is achieved by a multimedia device of the above-mentioned type, in that at least one information item is detected in an audio and/or video data stream processed by the multimedia device, the detected information items are saved as a function of a weighting consisting of the time of occurrence of an information item and at least one selection criterion, follow-up information relating to the information item selected by a user is displayed on an output unit of the multimedia device.

A user of a multimedia device is given the option of obtaining supplementary information about the contents of a television broadcast or video or audio recording. Detection of a plurality of information items occurring may be effected by an already known method such as Closed Caption in the USA and Teletext Subtitles in Europe and/or be supplemented by speech recognition, i.e. a method for the automatic recognition of words in spoken sentences or individually spoken words. An information item consists of an intellectual unit, which conveys the meaning (a summary of the important features of something). A meaningful abbreviation or one or more words may constitute an information item. The information items appearing during a broadcast in the picture within a text strip or caption are detected and recorded by the optical character reading method (OCR) applied to this picture.

The detected information items mentioned in a television broadcast from a past period and assessed as rare are saved in a list. The information items in the list are classified according to a selection criterion, such as for example probability of occurrence (rarity), and as a function of the time of mention (time of occurrence), such that the user may select the information items of interest to him/her.

Through an input on the multimedia device the user may obtain follow-up information by means of the list of information items displayed on the screen of the multimedia device and operating by the FIFO (First in First Out) principle or the information items of the list are explained in more detail. The ordered list is presented to the user, the information items being arranged in the list after weighting consisting of time of occurrence and probability of occurrence. The user may enter a limit value for the probability of occurrence of the information items in the data stream, below which the information items with a lower probability of occurrence are recorded and presented in the list.

After selection of the information item on which the user desires supplementary information, the supplementary information appears on the screen of the multimedia device. Thus, the user has the option of making inquiries about his/her specific uncertainties and obtains information about his/her individual questions. Information from a web page, a wordlist entry, a short video or a teletext page will appear in the form of a PiP (Program in Program) or by pausing the television broadcast on the screen.

After detection of the information items, the information items occurring are filtered out of the content of the broadcast on the basis of the speech data present and a first list is generated from the information items. The probability of occurrence of the information items is recorded and only those information items are removed from the speech data whose probability of occurrence does not reach a previously set limit value. The limit value for probability of occurrence may be set by the user him/herself.

A second list containing information items on which an information source can offer information is drawn up and aligned with the first list. Information items for which none of the information sources of the multimedia device can offer follow-up information are likewise detected (filtered) from the speech data and rejected.

The user selects the information item about which follow-up information is desired. If the multimedia device does not find any information in a first selected information source, it may access further information sources.

If the multimedia device is a device constituting part of a private digital network, any desired device with sufficient storage capacity may also for instance store a list drawn up at night. To reduce communication costs and effort, it is possible to dispense with searching through the accessible Internet sources and, instead, particularly stringent filtering of the information items may be performed according to the rarity/selection criterion, a prerequisite of which is a sufficiently extensive information item collection on a storage medium such as CD/DVD. The latest information is then made available as search engine results after a query has been submitted by the user via an Internet search engine.

The follow-up information is collected in various ways, depending on the information source. Information sources of the multimedia device may comprise storage media such as digital versatile disks (DVD), compact disks (CD), the Internet and other means. The information is searched and loaded from storage media such as DVD, CD, a database updated with data made available by an Internet provider or accessible Internet sources. Updating of the data may take place at a time when the user is not actively using the multimedia device.

Presentation of the information available in relation to the selected information item depends on the source of the information. If the follow-up information consists of film segments from a video on demand service or a digital versatile disk (DVD), the information is displayed by Program in Program (PiP) display on the screen of the multimedia device. An Internet search engine appears if the information originates as explanations from an external web page.

The user of the multimedia device is given the option of obtaining the specific information he/she desires. Provision of the information proceeds only at the request of the user.

The system may provide information conformed to the user's level of knowledge, by looking up the appropriate information sources, such that an improvement in adaptability may be achieved. Since the follow-up information is not transmitted in the audio/video data streams transmitted by a broadcaster, cooperation with the providers of the transmitted data is not necessary. By using the Internet as a source of information, particularly up-to-date information is available. To request the follow-up information, the user does not need to know the precise spelling of the information item, since the information item appears in a graded list on the screen of the multimedia device.

The invention relates to a method of presenting follow-up information relating to at least one information item in an audio/video data stream processed by the multimedia device. Information items detected with the method are saved in accordance with a weighting consisting of the time of occurrence of the information item and a selection criterion, and follow-up information relating to the information item selected by a user is presented on an output unit of the multimedia device.

The invention will be further described with reference to examples of embodiments shown in the drawings, to which, however, the invention is not restricted. In the Figures.

Figure 1:
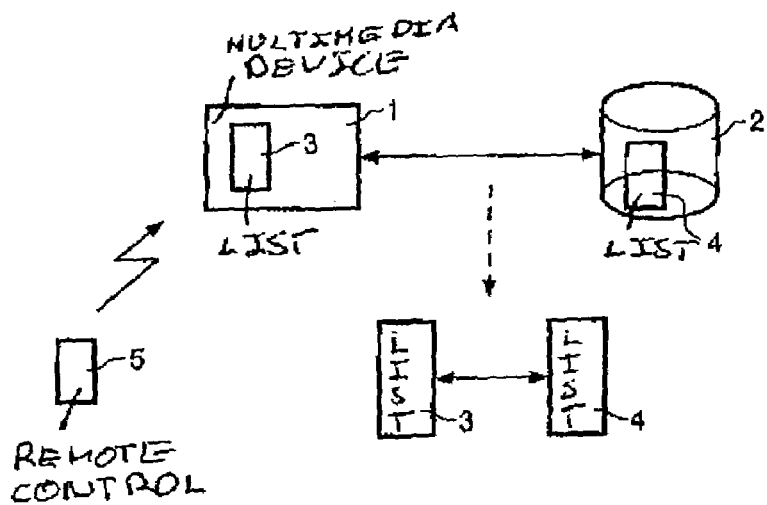
FIG. 1 shows a multimedia device during accessing of an information source

A multimedia device 1 shown in FIG. 1 is a device constituting part of a private digital network and is linked together with other devices into the private network. The multimedia device 1 may be controlled by a remote control 5, voice commands or other input mechanisms. A storage medium (e.g. a digital versatile disk (DVD) playback device) serves as an information source 2 for the multimedia device. A list 3 drawn up by the multimedia device 1 contains as information items the terms occurring in an audio and/or video data stream. The audio and/or video data stream is processed by the multimedia device and returns the contents on which the user desires follow-up information. A second list 4 containing terms on which follow-up information is available on the storage medium 2 may be retrieved therefrom.

A user of the private network watches a television broadcast (audio and video data stream) on a screen of the multimedia device 1 and would like follow-up information about the country mentioned during the broadcast.

The first list 3 contains terms which were recently extracted from the audio data stream of the broadcast (e.g. "camel driver"), the video data stream (e.g. "Algiers") and a subtitle stream (e.g. "Couscous"). It is aligned with the second list 4, which consists of terms relating to which follow-up information is available on the digital versatile disk of the DVD playback device 2, and presented to the user on request. By actuating a button of the remote control 5, a list 6 appears containing terms occurring in the broadcast weighted according to the user's selection criterion. From this list, the user selects the term of interest to him/her (e.g. "couscous"). The multimedia device 1 then retrieves the information relating to this term stored on the digital versatile disk of the DVD playback device. The follow-up information (for instance recipes and traditions) is presented to the user on the screen of the multimedia device in Program in Program (PiP) form.

Figure 2:
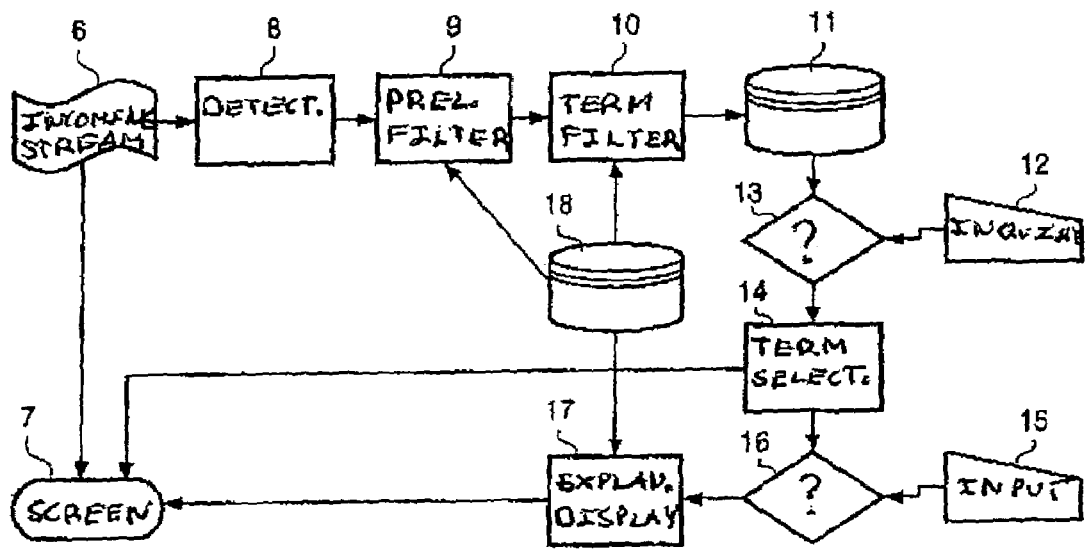
FIG. 2 shows a flowchart during accessing of an information source

The program elements, processed during the above-described scenario, of a controller responsible for control and management functions are listed and explained below with reference to a flowchart in FIG. 2. In detail, the flowchart consists of an incoming stream 6, a screen 7, an inquiry 12 and an input 15 and an explanation memory 18, together with the following processing steps performed within the controller: a detector 8, a preliminary filter 9, a term filter 10, a term list 11, two queries 13 and 16, term selection generation 14 and an explanation display 17.

Detection and Filtering of the Terms Occurring in the Data Stream:

The incoming audio and video stream 6 is not only displayed on the screen 7 but also passed to the detector 8, which extracts terms out of the incoming stream 6 by various mechanisms (e.g. by optical character reading of words appearing in the picture, by speech recognition of the audio signal or by simple processing of the teletext subtitles). The detector 8 outputs all terms detected in this way. To simplify further processing, the resultant term stream is reduced in the preliminary filter 9, by rejecting terms which are very probably not of interest to the user on the basis of information present locally in the controller. In the simplest case, this may consist of a "stop word" list, which contains terms occurring frequently in the corresponding language (e.g. "and", "or", "the", . . . ).

A term (word) detected in the data stream is compared with the terms contained in the word list. If the term is not present in the word list, the term is returned by a following program element.

```
String filter1(word:String)
{
    if(NOT word IN Wortliste)
            then return word;
    else return null;
}
```

In the term filter 10, all terms are rejected from the resultant term stream on which the term memory (i.e. in this example the DVD) does not contain any follow-up information. For this purpose, access to information external to the controller (for instance an index present on the DVD) is necessary. The following program element returns only those terms on which follow-up information is available.

```
String filter2(word: String)
{
    if(Datenspeicher.index.contains(word))
        then return word;
    else return null;
}
```

The term filter 10 may test several data memories for information relating to the term, wherein term databases do not have necessarily to be static, but may also be generated dynamically by other programs.

Adaptation to the level of knowledge of the user may be performed at this point in the program, by setting a limit value (cut-off level) for the probability of occurrence (frequency) of the term. For probabilities of occurrence which are higher than the limit value set, the associated term is of no interest to the user and is therefore not returned by the program element.

```
String filter2(word: String, benutzer: Person)
{
        float schnittlevel=benutzer.praeferenzen.haeufigkeitsschnittlevel;
        if(Haeufigkeitsliste.getHaeufigkeit(word) < schnittlevel)
        then return word;
        else return null;
}
```

In contrast to the preliminary filter, a frequency list is here located in the explanation memory 18 due to the scale thereof.

Storage of Relevant Terms

The terms (words) not rejected by preliminary filter 9 and term filter 10 are stored in a term list 11. The list drawn up operates according to the FIFO (First in First Out) principle, such it only ever contains the terms occurring recently. The following program element stores a term in a corresponding overall list together with its time of occurrence.

```
void intoList(word: String)
{
Time zeit=System.getTime();
ListEntry wortUndZeit;
        wortUndZeit.word=word;
        wortUndZeit.time=zeit;
        fifo.append(wortUndZeit);
        if(fifo.length>Preferences.fifolength)
        fifo.popFirst();
}
```

Upon an inquiry 12 from the user (for instance by actuating a remote control button), the query 13 is answered positively, for which reason a sensibly ordered list is produced for the user by the term selection generator 14 from the list drawn up in a program element intoList according to the FIFO principle. To achieve a high level of usefulness, a list is presented which is not simply classified by time of occurrence but which is additionally influenced by a selection criterion.

In the following program element, the selection criterion corresponds to frequency of occurrence of the term. Here, the variable N denotes the length of the list to be displayed and W1 or W2 denote a weighting of the term consisting of time of occurrence and frequency of occurrence.

```
Array[N] of String generateExplainableWordsList(Fifo list)
{
Array[N] of String ergebnis;
OrderedSet set;
SetEntry wortUndRating;
ListEntry wortUndZeit;
float rating;
        while(NOT list.empty)
        {
        wortUndZeit=list.getHead();
        list.removeHead();
        rating=(wortUndZeit.time-current Time)*W1
                +Haeufigkeitsliste.getHaeufigkeit(wortUndZeit.wort)*W2;
        wortUndRating.wort= wortUndZeit.wort;
        wortUndRating.rating=rating;
        set.insertOrdered(wortUndRating)
        }
        for(int i=1 to N)
        {
        ergebnis[i]=set.getTopmostItem().wort;
        set.removeTopmostItem();
        }
        return ergebnis;
}
```

This list is then displayed on the screen and the user is thus given the opportunity to select a term (for instance by the number buttons on the remote control). As soon as the user has made his selection, it is communicated via the input 15 to the query 16 about the selected term. The query 16 is answered positively and the associated follow-up information (e.g. a video data stream or a text) is fetched from the explanation memory 18 by the explanation display 17 and displayed on the screen 7.

A plurality of application scenarios relating to the multimedia device according to the invention are explained in brief below.

During radio transmission of a football match on the multimedia device, the user may, on the basis of the player names detected by speech recognition, request from an appropriate information source pictures of the players and/or their biographies on an output unit of the multimedia device 1.

The detector 8 in this case operates by speech recognition. The explanation memory 18 comprises either a CD supplied for example with a sports magazine or data stored on one or more web sites (for example belonging to the football clubs), for which an index has been drawn up and stored in the memory. The term filter 10 will feed only terms contained in the index into the FIFO list. The request for follow-up information (inquiry 12) proceeds for instance as indicated in the detailed example of FIG. 1 via an additionally available screen, but may also be restricted by speech recognition and synthesis to the in-/output possibilities of the hi-fi apparatus.

The multimedia device 1 becomes particularly useful when the user is following any broadcast in a foreign language. With a DVD dictionary serving as information source, the user is given the option of requesting a translation for unfamiliar words in the foreign language.

The processing steps proceed as indicated in the detailed example. The preliminary filter 9 will, however, have to be provided with a list contained on the DVD (flowchart in FIG. 2), which corresponds to the explanation memory 18, since it has to be adapted to a different language. If the DVD is supplied together with a language course, the term filter 10 will proceed less on the basis of a general frequency distribution of the terms, but instead will enter those words in the list which the user has not yet or only just learned from the course.

A user who is following a distance-learning course through an educational broadcast may, with a textbook matching the educational broadcast and stored on a DVD, gain an effective understanding of the subject matter under study through parallel sources of information (educational broadcast and supplementary textbook).

The individual processing steps again proceed as indicated, but optionally the parameters of the term filter 9 may be set to match the progress made by the user in his/her studies, as in the previous example.

An Internet-based provider of shares information makes optical character recognition (OCR) available to the user, which allows the user, during a broadcast, to detect terms from a text strip consisting of words and abbreviations running across the screen, such that up-to-date information relating to the contents (stock-market prices) of the text strip may be fetched from the Internet.

The possibility of enabling a user cheaply to access information about share prices at the same time offers extensive background information about shares, companies etc. Detection proceeds by OCR over a limited area of the screen. Provided that an area to be handled by the detector 8 may be sufficiently restricted to the ticker strip, a preliminary filter is unnecessary. Should the information provider additionally be sure of having follow-up information about all the abbreviations appearing in the text strip, the term filter 10 may also be dispensed with. In this case, the explanation memory 18 is a web site of the information provider and the explanation display 17 will retrieve the follow-up information therefrom when requested by the user.

A manufacturer supplies the user with a data package for example in the form of a compact disk (CD). During a competitor's sales broadcast, the user may, by submitting an inquiry to the multimedia device, obtain information about the manufacturer's product range stored on the CD so as to be able to compare this with all the products named on the screen of the multimedia device during the sales broadcast.

The CD contains product information and an index of the products available, so that filtering in accordance with a special frequency list is not performed. The term filter selects only all the terms present on the CD for storage in the FIFO list. Receipt of user inputs may optionally be suppressed (inquiry 12) and information is automatically displayed if a competitor's product is mentioned.

The invention claimed is:

1. A multimedia device for detecting at least one information item in an audio and/or video data stream processed by the multimedia device, said device comprising:

at least one memory configured for saving a detected one or more of said at least one information item according to a mathematical function evaluated on a weighted average that weighs a time of occurrence of a respective one of said detected one or more against a value to which at least one selection criterion is applied in making a selection; and an output unit configured for presenting follow-up information relating to an item from among said one or more saved that has been selected by a user.

2. A multimedia device as claimed in claim 1, configured for drawing up and aligning, with one another, a first list (3) of said one or more information items detected in the audio and/or video data stream and a second list (4) of information items present in relation to the follow-up information.

3. A multimedia device as claimed in claim 2, configured for including in the first list (3) information items whose respective probabilities of occurrence is less than a limit value and whose respective time of occurrence in the audio and/or video data stream is recorded.

4. A multimedia device as claimed in claim 1, configured for searching, for follow-up information, at least one information source (2), such that, in event of no follow-up information being found in a first of said at least one information source, a further one of said at least one information source is searched.

5. A multimedia device as claimed in claim 4, configured for presenting, to the user, follow-up information in accordance with an information source in which the follow-up information to be presented is found.

6. The multimedia device of claim 1, configured such that said making a selection decides whether said respective one is saved in said saving.

7. The multimedia device of claim 6, wherein said value relates to said respective one.

8. The multimedia device of claim 1, wherein said value relates to said respective one.

9. The multimedia device of claim 1, wherein said weighted average also weighs a current time against said value.

10. The multimedia device of claim 1, wherein said stream is at least part of a television broadcast, said time of occurrence corresponding to time of occurrence within the broadcast.

11. A method of presenting follow-up information, comprising:

detecting at least one information item in an audio and/or video data stream processed by the multimedia device;

saving a detected one or more of said at least one information item according to a mathematical function evaluated on a weighted average that weighs a time of occurrence of a respective one of said detected one or more against a value to which at least one selection criterion is applied in making a selection; and presenting follow-up information relating to an item from among said one or more saved that has been selected by a user.

12. The method of claim 11, wherein said making a selection decides whether said respective one is saved in said saving.

13. The method of claim 12, wherein said value relates to said respective one.

14. The method of claim 11, wherein said value relates to said respective one.

15. The method of claim 11, wherein said stream is at least part of a television broadcast, said time of occurrence corresponding to time of occurrence within the broadcast.

16. A network having at least one multimedia device for detecting at least one information item in an audio/video data stream processed by the multimedia device, comprising:

at least one memory configured for saving a detected one or more of said at least one information item according to a mathematical function evaluated on a weighted average that weighs a time of occurrence of a respective one of said detected one or more against a value to which at least one selection criterion is applied in making a selection; and an output unit configured for presenting follow-up information relating to an item from among said one or more saved that has been selected by a user.

17. The network of claim 16, configured such that said making a selection decides whether said respective one is saved in said saving.

18. The network of claim 17, wherein said value relates to said respective one.

19. The network of claim 16, wherein said value relates to said respective one.

20. The network of claim 16, wherein said stream is at least part of a television broadcast, said time of occurrence corresponding to time of occurrence within the broadcast.

* * * * *